United States Patent
Henyan

(10) Patent No.: US 6,591,697 B2
(45) Date of Patent: Jul. 15, 2003

(54) METHOD FOR DETERMINING PUMP FLOW RATES USING MOTOR TORQUE MEASUREMENTS

(76) Inventor: Oakley Henyan, 3700 E. Genesee St., Auburn, NY (US) 13021

(*) Notice: Subject to any disclaimer, the term of this patent is extended or adjusted under 35 U.S.C. 154(b) by 0 days.

(21) Appl. No.: 09/832,760

(22) Filed: Apr. 11, 2001

(65) Prior Publication Data

US 2002/0162402 A1 Nov. 7, 2002

(51) Int. Cl.[7] .................................................. G01F 1/28
(52) U.S. Cl. ..................................................... 73/861.71
(58) Field of Search ............................. 73/861.71, 502, 73/116, 862.323, 861.06, 9; 166/250.15; 91/1; 60/431; 318/254, 433, 432, 798, 799; 702/41, 45, 50, 114, 145–147, 127, 128, 150, 170; 222/1

(56) References Cited

U.S. PATENT DOCUMENTS

| | | | | |
|---|---|---|---|---|
| 4,679,488 A | * | 7/1987 | Krutz et al. ..................... | 91/1 |
| 4,760,513 A | * | 7/1988 | Edwards ..................... | 364/174 |
| 4,978,896 A | * | 12/1990 | Shah .......................... | 318/254 |
| 5,303,551 A | * | 4/1994 | Lee ............................. | 60/431 |
| 6,167,965 B1 | * | 1/2001 | Bearden et al. ........ | 166/250.15 |

* cited by examiner

Primary Examiner—Hezron Williams
Assistant Examiner—Jewel Thompson

(57) ABSTRACT

A method and system for determining fluid flow rates through a motor driven pump controlled by a variable speed drive is disclosed. The variable speed motor drive is used to characterize a pump fluid flow for a plurality of motor torque values at a plurality of known pump speeds. These characterized pump flow rate/torque values/speed are stored and used to determine a pump fluid flow at a measured pump speed and motor torque by interpolating between the known characterized fluid flow/torque/speed values. In another aspect of the invention, the pump flow rate at a measured torque, at a specified characterizing speed value is determined by interpolating between known characterizing pump flow rates. The determined pump flow rates can then be used to determine pump flow rates at a measured speed by interpolating between corresponding speed values which bound the measured speed.

19 Claims, 2 Drawing Sheets

METHOD FOR DETERMINING PUMP FLOW RATES USING MOTOR TORQUE MEASUREMENTS

FIELD OF THE INVENTION

This invention relates to fluid flow rate measurements. More specifically, this invention relates to determining fluid flow rates using measured motor speed and torque parameters.

BACKGROUND OF THE INVENTION

Measurement of fluid flow through pipes and pumps is well known in the art. One method of determining fluid flow rates is to install gears, vanes, paddle wheel, turbines, etc., in the flow channel and determine fluid flow rate by the speed at which these devices turn. A second method is by measuring the differential pressure across a dedicated flow obstruction, such as a venturi, orifice plate, annubar, pitot tube, etc., and applying the well-known Bernoulli's principle to obtain a velocity and, consequentially, a fluid flow rate. As an example of this principle, U.S. Pat. No. 5,129,264, entitled "Centrifugal Pump with Flow Measurement," issued Jul. 14, 1992, to Lorenc, and assigned to the same assignee herein discloses using differential pressure and pump speed to measure fluid flow rates. Still other methods of fluid flow rate measurement employ electrical/magnetic or sonic measurement means. For example, Mag Meters determine fluid flow rates by measuring the change in a magnetic field caused by the velocity of the fluid flowing therethrough. Sonic devices use acoustical pulses, i.e., Sonar, and Doppler principles to measure fluid flow rates. Other non-intrusive methods measure the torque a variable speed electrical motor delivers to a pump by installing a torque shaft between the motor and pump. The motor or pump is then calibrated and a motor kilowatt input/Motor Brake Horsepower Output (BHP) calibration table is developed. Accordingly, knowledge of the kilowatt input value can be used to determine the output horsepower. However, this calibration is needed at several speeds and requires several different sized torque shafts.

Thus, current methods for determining fluid flow rates necessitate intrusion into, or require access to, the enclosures transporting the fluid. In some systems, such as caustic systems having lined pumps, intrusion is prohibited.

Hence, there is a need for a simple, accurate and reliable method for determining fluid flow rates without intruding into the fluid flow or having access to the enclosures transporting the fluid.

SUMMARY OF THE INVENTION

The present invention determines a fluid flow rate through a pump by first determining two flow rate values from a plurality of characterizing flow rate values corresponding to two known speed values selected from a plurality of known characterizing speed values at a known motor torque. The first one of the two known speed values is selected greater than a measured pump speed and a second one of the two known speed values is selected less than the measured pump speed. The fluid flow rate is then determined as being proportional to the two determined flow values at the known speed values and the pump speed.

Figure 1:
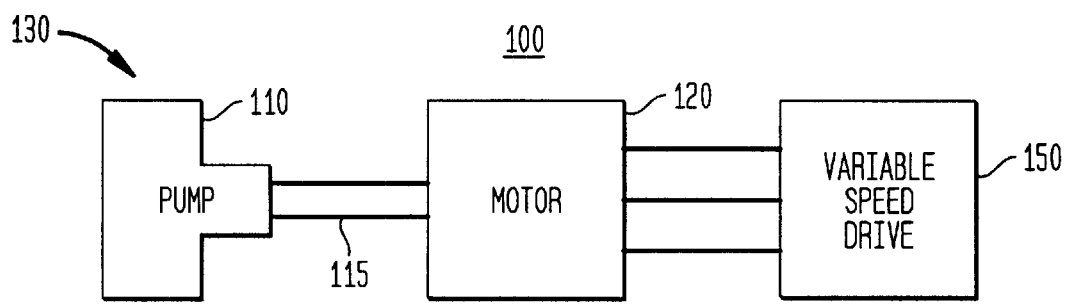
FIG. 1 illustrates a conventional pump driven by a variable speed/motor drive system.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE INVENTION

This invention applies to the ability of new generation variable speed drives (VFD), such as the available ABB ACS601, to characterize the motor that they drive and accurately determined the torque being produced by the motor to the pump. A motor may be characterized by determining a fluid flow rate through a pump at a plurality of known speeds and torque values. The characterization flow rate/torque information is retained and used to determine fluid flow rate at measured, non-characterized, speed and torque values.

FIG. 1 illustrates an exemplary system configuration of a pumping system 100. In this exemplary system, motor 120 communicates with pump 110 through shaft 115 and produces a rotary motion in shaft 115 that imposes a rotary motion on an impeller unit (not shown) within pump 110. The rotation of the impeller causes fluid within pump 110 to be expelled through an output orifice 130. Variable speed motor drive (VFD) 150 provides control signals to motor 120, which control the speed of motor 120.

Figure 2:
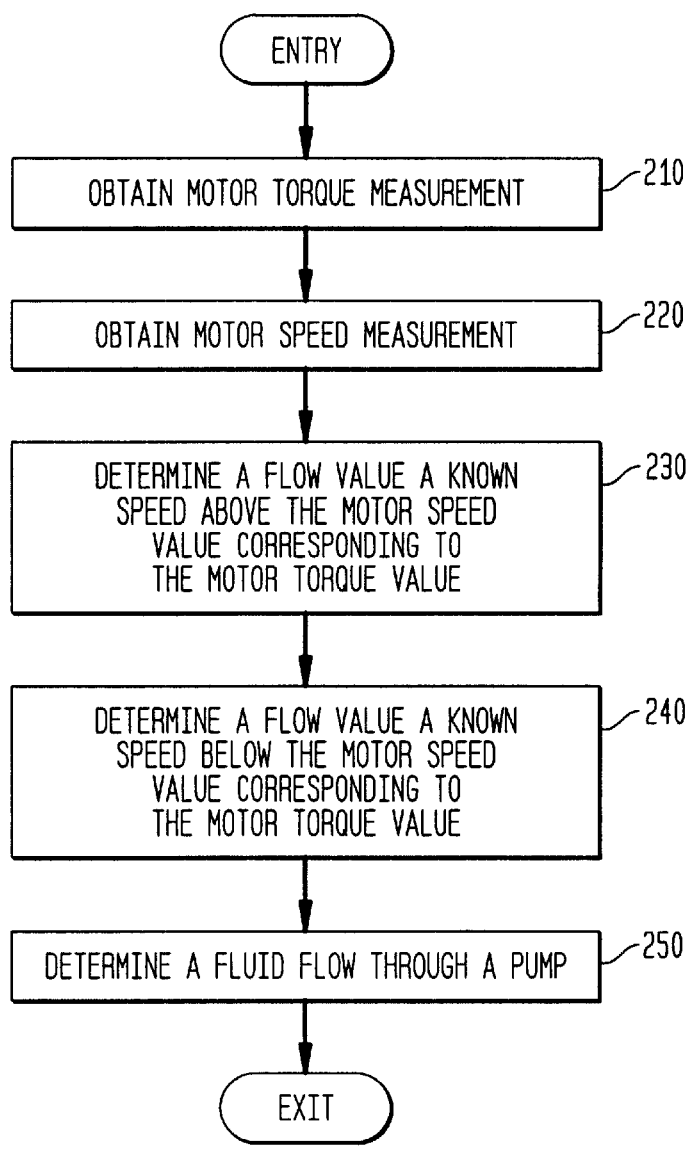
FIG. 2 illustrates an exemplary processing flow chart in accordance with the principles of the present invention.

FIG. 2 illustrates an exemplary flow chart of fluid flow rate determination processing in accordance with the present invention. As illustrated, a motor torque measurement is obtained at block 210 and a motor speed is obtained at block 220. Motor torque and speed measurements using VFD 150 is well known in the art. For example, torque transducers utilize resistive, photoelectric or strain gauge sensors, such as metal foil or piezo-resistive sources. The metal foil devices are placed on a shaft of the motor and the leads from the device are carried through the shaft to slip rings, which are brushes that are attached to monitor output terminals. The output measured at the terminals can be used to measure motor torque.

At block 230 a flow rate value is determined for a known speed value above the measured motor speed value corresponding to the measured motor torque value. At block 240 a flow rate value is determined for a known speed value lower than the measured motor speed value corresponding to the measured motor torque value. At block 250 a fluid flow rate value is determined by evaluating a proportional relation between the obtained two fluid flow rate values, the corresponding speed values and the measured pump speed.

In one embodiment of the invention, an actual flow rate value is determined by performing a linear proportional evaluation, e.g., an interpolation, in accordance with Equation 1:

$$F_x = F_2 + \frac{(S_k - S_2)(F_1 - F_2)}{(S_1 - S_2)} \quad [1]$$

Where
- $F_x$ is the actual flow at a measured torque value;
- $S_k$ is the pump speed;
- $S_1$ is a known speed greater than $S_k$
- $S_2$ is a known speed lower than $S_k$;
- $F_1$ is the flow rate at known speed $S_1$ at a measured torque value; and
- $F_2$ is the flow rate at known speed $S_2$ at a measure torque value.

Figure 3:
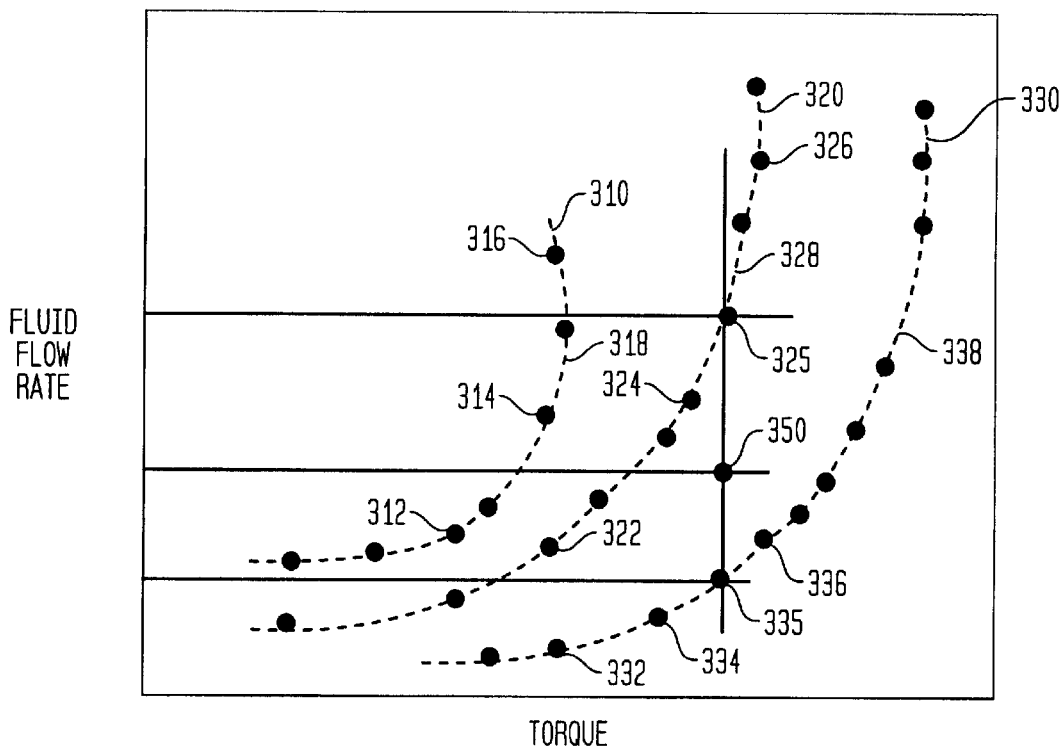
FIG. 3 illustrates a determination of a fluid flow rate using an exemplary torque vs. flow rate graph in accordance with the principles of the invention.

FIG. 3 illustrates an example of the processing to determine fluid flow rate in accordance with the principles of the present invention. In this illustrated example, the graph 300 depicts Fluid Flow versus Motor Torque to show the characterization of fluid flow rates through a pump at known motor torque values. In the example, this is shown three different pump speeds. As would be appreciated, of different pump speeds used to characterize the fluid flow may be substantially increased without altering the principles of the invention. In graph 300, measurements of torque and corresponding fluid flow rate are plotted for each of the illustrated speeds, 310, 320, 330, respectively. Flow rate/torque values 312, 314, 316 etc., are representative of flow rate/torque values that characterize a motor performance at a first speed 310. Similarly, flow rate/torque values 322, 324, 326, etc., and 332, 334, 336, etc., are representative of flow rate/torque values that characterize a motor performance at the illustrated second and third speed, respectively. Accordingly, there is a fluid flow rate value associated with each torque value at a specified speed.

Further illustrated, are dashed lines 318, 328 and 338, which are representative of polynomial expressions that can be used to evaluate and determine pump fluid flow rates at measured, non-characterized, torque values at measured, non-characterized, pump speed. Although illustrated as high-order polynomial expressions, it is appreciated, that the polynomial expression may be selected as a linear, a piecewise linear, a quadratic expression, etc. A polynomial expression can be selected, for example, to minimize a mean square error among the characterizing flow rate/torque values at each of the specified characterizing speeds.

FIG. 3, further, graphically illustrates the determination of pump fluid flow rate at a measured torque and speed in accordance with the principles of the invention. In this illustrated example, a measured pump speed/motor torque value 350 is determined using known techniques associated with variable speed motor drives. Known characterized fluid flow/torque values, corresponding to the measured torque value, are next obtained for a characterization speed value higher than the measured speed value and a characterization speed value lower that the measured speed value. In this case, characterization fluid flow/torque values 325 and 335 are determined for a higher and a lower speed value, respectively.

An actual fluid flow rate value 350, associated with the measured speed/torque values can then be obtained by interpolating between the higher speed fluid flow value 325 and the lower speed fluid flow value 335. In one aspect of the invention, the interpolation algorithm utilized corresponds to a linear interpolation between the fluid flow rate/torque values determined at the higher and lower speed values.

Although FIG. 3 illustrates the principles of the invention, with regard to a measured torque value corresponding to a characterizing torque value, it is understood that a polynomial expression may be used to determine fluid flow rates at a designated characterizing speed when the measured torque does not correspond to one of the plurality of characterizing torque values.

Figure 4:
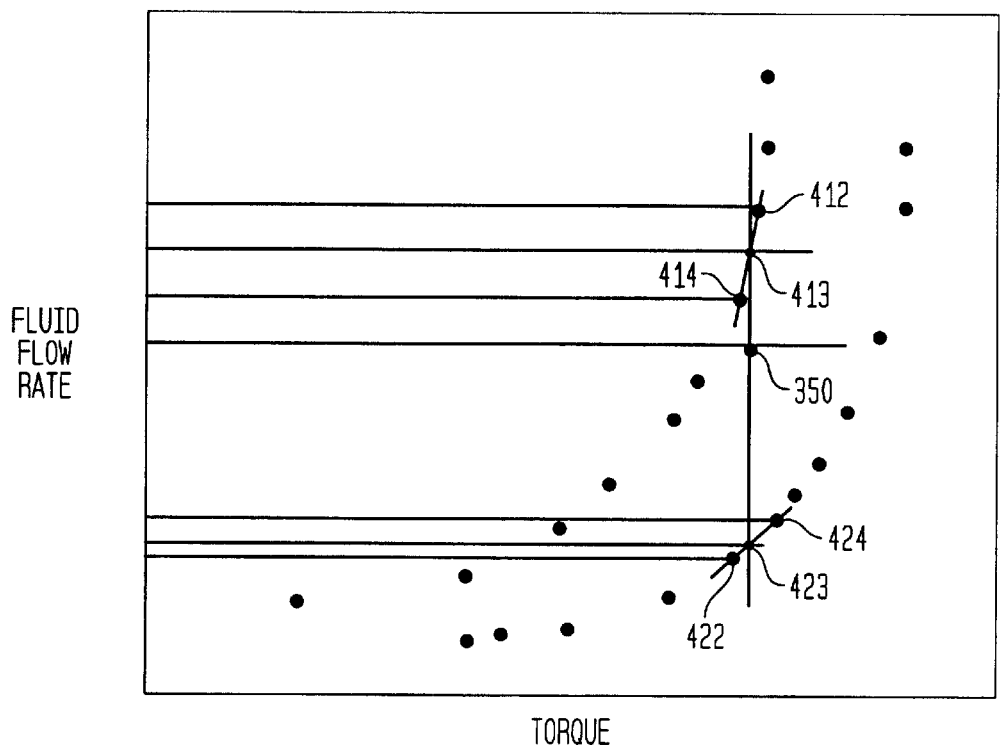
FIG. 4 illustrates a second determination of a fluid flow rate using an exemplary torque vs. flow graph in accordance with the principles of the invention.

FIG. 4 illustrates a second aspect of the invention, wherein characterization of fluid flow rates at non-measured fluid flow/torque values may be obtained by interpolating, for example, between known characterization fluid flow/torque values. More specifically, a plurality of characterizing fluid flow/torque values are retained, for example in a memory, for each of a plurality of characterizing speed values. For measured pump speed/torque value 350, a fluid flow rate is determined at a first characterization speed value by interpolating between two characterization flow rate/torque values associated with the characterization speed. In this illustrated example, first fluid flow rate value 413 associated with a known characterization speed higher than the measured speed/torque value 350 is determined by interpolating between characterization values 412 and 414. Characterization values 412, 414 are associated with torque values which bound the measured torque value. Similarly, a second fluid flow rate is determined at a second characterization speed by interpolating between two characterization flow rate/torque values. In this illustrated example, a second fluid value 423 associated with a known characterization speed lower than the measured speed/torque value 350 is determined by interpolating between characterization values 422 and 424. These values are also associated with torque values, which bound the measured torque value.

A fluid flow rate corresponding to the measured speed/torque value 350 is then determined, for example, by interpolating between the determined two fluid flow values 413, 423, the two known characterizing speed values, and the measured speed, as previously disclosed.

Although the invention has been described and pictured in a preferred form, it is, however, understood that the present disclosure of the preferred form, has been made only by way of example, and that numerous changes in the details may be made without departing from the spirit and scope of the invention as hereinafter claimed. It is intended that the patent shall cover by suitable expression in the appended claims, those features of patentable novelty that exists in the invention disclosed.

I claim:

1. A method for determining an actual fluid flow rate of a fluid flowing through a pump without intruding into the fluid flow, the pump driven by a motor, the method comprising the steps of:

obtaining a motor speed measurement value of the motor;

obtaining a motor torque measurement value of the motor;

determining a first fluid flow rate value for a known speed value above the motor speed measurement value corresponding to the motor torque measurement value;

determining a second fluid flow rate value for a known speed value lower than the motor speed measurement value corresponding to the motor torque measurement value; and evaluating a proportional relation between the first and second fluid flow rate values to obtain the actual fluid flow rate.

2. The method as recited in claim 1 wherein said motor torque measurement value is determined by a variable speed drive.

3. The method as recited in claim 1 wherein said speed measurement value is determined by a variable speed drive.

4. The method as recited in claim 1 wherein said proportional relation is a polynomial relation.

5. The method as recited in claim 4 wherein said polynomial relation is a linear polynomial relation.

6. The method as recited in claim 4 wherein said polynomial relation is a quadratic polynomial relation.

7. The method as recited in claim 5 wherein said polynomial relation is determined as having a minimum mean square error among said flow rate values.

8. The method as recited in claim 1 wherein said relation is piece-wise linear relation between the flow rate values.

9. The method as recited in claim 1 wherein said proportional relation is a linear relation.

10. A system for determining an actual fluid flow rate of a fluid flowing through a pump without intruding into the fluid flow, the pump driven by a motor, the system comprising:

means for obtaining a motor speed measurement value of the motor;

means for obtaining a motor torque measurement value of the motor;

means for determining a first fluid flow rate value for a known speed value above the motor speed measurement value corresponding to the motor torque measurement value;

means for determining a second fluid flow rate value for a known speed value lower than the motor speed measurement value corresponding to the motor torque measurement value; and means for evaluating a proportional relation between the first and second fluid flow rate values to obtain the actual fluid flow rate.

11. The system as recited in claim 10 wherein said motor torque measuring means comprises:

a torque measurement device selected from the group consisting of resistive, photoelectric, strain gauge sensors.

12. The system as recited in claim 1 wherein said proportional relation is a a polynomial relation.

13. The system as recited in claim 12 wherein said polynomial relation is a linear polynomial relation.

14. The system as recited in claim 12 wherein said polynomial relation is determined as having a minimum mean square error among said flow rate values.

15. The system as recited in claim 1 wherein said relation is piece-wise linear relation between the flow values.

16. The system as recited in claim 12 wherein said polynomial relation is a quadratic polynomial relation.

17. The system as recited in claim 10 wherein said proportional relation is a linear relation.

18. The method as recited in claim 1, wherein the evaluating step is performed by interpolating between the first and second fluid flow rate values to obtain the actual fluid flow rate.

19. The system as recited in claim 10, wherein the evaluating means includes means for interpolating between the first and second fluid flow rate values to obtain the actual fluid flow rate.

* * * * *